(12) United States Patent
Huang et al.

(10) Patent No.: US 8,526,270 B1
(45) Date of Patent: Sep. 3, 2013

(54) ACOUSTIC MULTIFUNCTIONAL STANDARD CALIBRATION METHOD

(76) Inventors: Dehua Huang, Newport, RI (US); Scott K. Mayer, Hope Valley, RI (US)

( * ) Notice: Subject to any disclaimer, the term of this patent is extended or adjusted under 35 U.S.C. 154(b) by 234 days.

(21) Appl. No.: 13/228,643

(22) Filed: Sep. 9, 2011

(51) Int. Cl.
  *H04B 1/02* (2006.01)
  *H04B 17/00* (2006.01)
  *G01S 3/80* (2006.01)

(52) U.S. Cl.
  USPC .............................. 367/131; 367/13

(58) Field of Classification Search
  USPC ................................... 367/131, 13
  See application file for complete search history.

(56) References Cited

U.S. PATENT DOCUMENTS

| | | | | |
|---|---|---|---|---|
| 5,309,411 A | * | 5/1994 | Huang et al. | 367/140 |
| 5,579,285 A | * | 11/1996 | Hubert | 367/133 |
| 7,274,622 B1 | * | 9/2007 | Huang et al. | 367/105 |
| 7,302,744 B1 | * | 12/2007 | Huang | 367/153 |
| 7,599,253 B1 | * | 10/2009 | Huang | 367/130 |
| 2008/0165617 A1 | * | 7/2008 | Abbot et al. | 367/131 |

OTHER PUBLICATIONS

Urick, Principles of underwater sound, McGraw-Hill Book Company, 3rd ed, 1983, p. 53.*
Van Buren, "Procedure for the in situ calibration of Sonar transducers", Jul. 1985.*
Huang, An Acoustic Multifunctional Standard Calibration Method, May 2012.*

* cited by examiner

*Primary Examiner* — Daniel Pihulic

(57) ABSTRACT

A method for using a deployable, small package acoustic transmitter device is taught, which serves as a standard acoustic source for on-vessel, in-mission field calibration purposes. The method involves deploying an acoustic transmitter device underwater to provide a predefined acoustic energy source for sonar array detection as well as periodic time-coded acoustic signal pulses for tracking and calibration of passive ranging.

12 Claims, 2 Drawing Sheets

ACOUSTIC MULTIFUNCTIONAL STANDARD CALIBRATION METHOD

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to acoustic transmitter devices and in particular to a method for using a deployable, small package acoustic transmitter device, which serves as a standard acoustic source for on-vessel, in-mission field calibration purposes.

(2) Description of the Prior Art

Individual acoustic hydrophone elements for sonar arrays are typically calibrated one by one before being assembled into an array for deployment on a marine vessel. Once such arrays are in service, on-vessel array calibration is a challenging and costly process. Furthermore, after years of service, sonar array performance degrades for many reasons, such as due to environmental effects. To quantify array degradation, an independent standard acoustic source is needed for on-vessel array detection and tracking, which can not only act as a multi-configurable acoustic source, but also, in conjunction with a receiver decoder, can provide the true ray-path range from the independent standard acoustic source to the marine vessel for in-mission sonar passive ranging systems calibration.

For this reason, what is needed is a deployable, small package acoustic transmitter device, which serves as a standard multi-configurable acoustic source for on-vessel, in-mission field array detection, tracking, and calibration.

SUMMARY OF THE INVENTION

It is a general purpose and objective of the present invention to provide an independent standard acoustic source for on-vessel array detection and tracking.

It is a further objective for said acoustic source to not only act as a multi-configurable acoustic source, but to function in conjunction with a receiver decoder, to provide the true ray-path range from the source to the vessel for in-mission sonar passive ranging systems calibration.

These objectives are accomplished by a method employing a disposable, launchable, multifunctional acoustic transmitter device similar to an expendable bathythermograph. The primary functions of this acoustic transmitter device are to transmit a predefined acoustic signal at a selectable depth over a certain period of time with time coded information embedded within the acoustic signal for range information via time-of-flight calculations.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
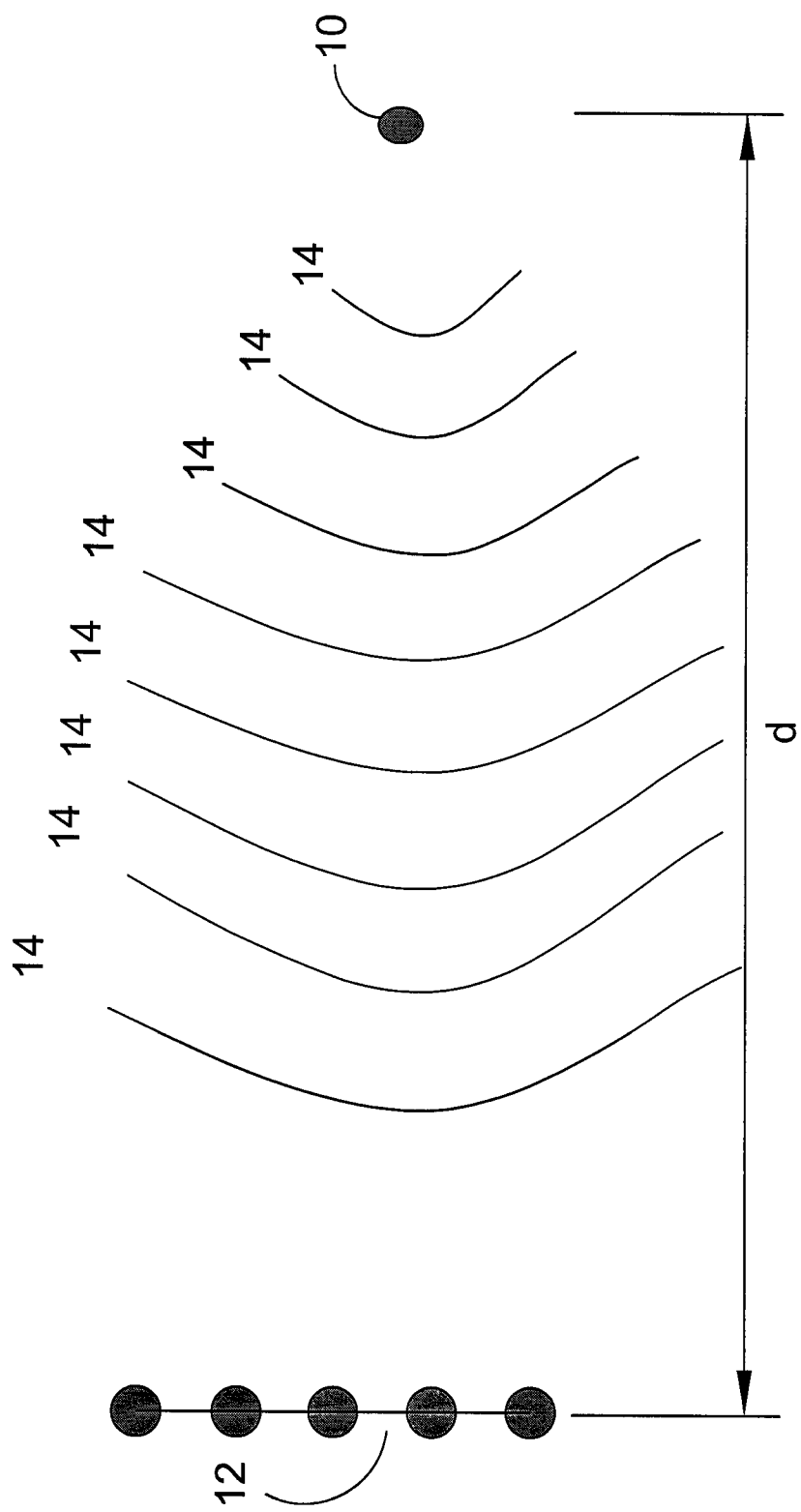
FIG. 1 is an illustration of the of the acoustic transmitter device of the present invention transmitting signals at a distance from a receiving array.

Referring now to FIG. 1 there is illustrated an acoustic transmitter device 10 of the present invention comprised of a calibration source device for on-vessel, in mission acoustic array sensitivity and performance calibrations. The acoustic transmitter device 10 is deployed a distance d from a receiving array 12 joined to a marine vessel (not shown), and transmits a selection of predefined standard acoustic signals 14 to ensonify at least one acoustic receiver in the receiving array 12. The acoustic transmitter device 10 can be used in a standalone fashion, to transmit and to stay at a predefined depth for a certain period of time, or to change depth during transmit operation at a selectable rate. It can also be reconfigured to record own ship projected acoustic signals. The acoustic transmitter device 10 can be a small package device (in a preferred embodiment a three foot long cylinder shape) similar in dimensions and deployment to an expendable bathythermograph (XBT), deployable by a submerged vessel's three-inch launcher, surface ship, helicopter, or other convenient launch methods. It is capable of transmitting predefined acoustic signals 14 to certain accuracy. It generates a predefined acoustic source level signal 14. It is capable of encoding required information (such as time to determine true range) into the predefined acoustic signals 14. It is able to maintain or traverse at a predefined water depth or change depth at a predefined rate. It is capable of transferring or recording data prior to launch. It can be reconfigured to record data vice project acoustic signals. It can be controlled and powered (i.e., on/off) by a remote controlled trigger signal. It is capable of either a self destruct (sink) mode or a float (for retrieval) mode after completion of acoustic signal transmissions.

The operational concept of the acoustic transmitter device 10 of the present invention is illustrated in FIG. 1. The encoded time information is generated from a synchronized clock (not shown). It can also be from an electric radio frequency (RF) signal or by a global positioning satellite (GPS) signal, if the acoustic transmitter device 10 can establish a wireless data link to a surface buoy antenna (not shown). The time code capability requires that both the acoustic transmitter device 10 and the receiving array 12 have synchronized clocks. The acoustic transmitter device 10 transmits a predefined source signal 14. It then periodically transmits (in addition to its continuing acoustic signal) a time coded signal. The timing information from the time coded signal received by the receiving array 12 is decoded by a computer (not shown) that calculates (through signal processing) the duration that the time coded signal traveled in the water. Based on a separately input sound speed, the acoustic ray path slant range is also calculated by the computer. Based on the information received at the receiving array 12, standard methods known in the art are then available for use to accurately calibrate an on-vessel receiving array 12.

Figure 2:
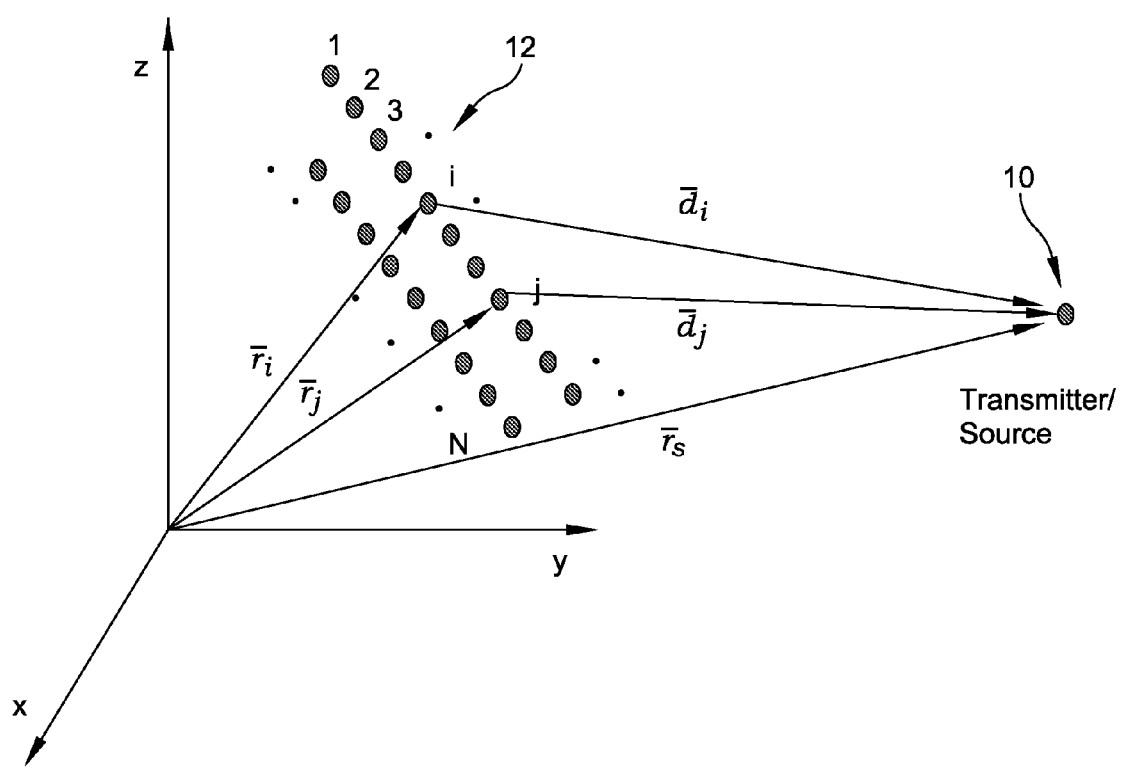
FIG. 2 is an illustration of the deployment of the acoustic transmitter device for the purpose of determining true range and calibration.

Referring to FIG. 2, illustrating geometric locations of the deployable acoustic transmitter device 10 and the on-vessel receiving arrays 12, an acoustic transmitter device 10 at $\vec{r}_s$ is deployed at a distance $|\vec{d}_i|$ from the ith receiving array 12, where i equals 1 to N. The vector $\vec{r}_i$ is the position vector of the ith on-vessel acoustic receiving array. For a homogeneous medium, the following equations hold:

$$\begin{cases} |\vec{d}_i| = |\vec{r}_S - \vec{r}_i| \\ t_i = |\vec{d}_i|/c \quad i, j = 1, 2, \ldots, N, \\ \tau_{ij} = (|\vec{d}_i| - |\vec{d}_j|)/c \end{cases} \quad (1)$$

In the above equation (1), c is the propagation sound speed of the medium, $t_i$ and $\tau_{ij}$ are the signal travel time to the ith array and the difference of the propagation time between ith and jth receiving arrays respectively. Due to the timestamp coded transmitter signal, the duration of the propagation time for the distance between the acoustic transmitter device 10 and the ith receiver 12 is measureable. However, the exact coordinates of $x_s$, $Y_s$ and $z_s$ for the acoustic transmitter device 10 also need to be determined. These quantities are subject to the following N governing equations:

$$\begin{cases} |\vec{d}_1| = \sqrt{(x_S - x_1)^2 + (y_S - y_1)^2 + (z_S - z_1)^2} \\ |\vec{d}_2| = \sqrt{(x_S - x_2)^2 + (y_S - y_2)^2 + (z_S - z_2)^2} \\ \quad \vdots \\ |\vec{d}_i| = \sqrt{(x_S - x_i)^2 + (y_S - y_i)^2 + (z_S - z_i)^2} \\ \quad \vdots \\ |\vec{d}_N| = \sqrt{(x_S - x_N)^2 + (y_S - y_N)^2 + (z_S - z_N)^2}, \end{cases} \quad (2)$$

where the three unknown variables of $x_s$, $y_s$ and $z_s$ can be over determined.

In the case where the position of the ith sensor or array coordinates of $x_i$, $y_i$ and $z_i$ are to be calibrated, the following iteration of equations is used:

$$\begin{cases} |\tau_{1,i}| = \dfrac{|\vec{d}_1| - |\vec{d}_i|}{c} = \dfrac{1}{c}\left(\sqrt{(x_S - x_1)^2 + (y_S - y_1)^2 + (z_S - z_1)^2} - \sqrt{(x_S - x_i)^2 + (y_S - y_i)^2 + (z_S - z_i)^2}\right) \\ |\tau_{2,i}| = \dfrac{|\vec{d}_2| - |\vec{d}_i|}{c} = \dfrac{1}{c}\left(\sqrt{(x_S - x_2)^2 + (y_S - y_2)^2 + (z_S - z_2)^2} - \sqrt{(x_S - x_i)^2 + (y_S - y_i)^2 + (z_S - z_i)^2}\right) \\ \quad \vdots \\ |\tau_{i-1,i}| = \dfrac{|\vec{d}_{i-1}| - |\vec{d}_i|}{c} = \dfrac{1}{c}\left(\sqrt{(x_S - x_{i-1})^2 + (y_S - y_{i-1})^2 + (z_S - z_{i-1})^2} - \sqrt{(x_S - x_i)^2 + (y_S - y_i)^2 + (z_S - z_i)^2}\right) \\ |\tau_{i-1,i}| = \dfrac{|\vec{d}_{i+1}| - |\vec{d}_i|}{c} = \dfrac{1}{c}\left(\sqrt{(x_S - x_{i+1})^2 + (y_S - y_{i+1})^2 + (z_S - z_{i+1})^2} - \sqrt{(x_S - x_i)^2 + (y_S - y_i)^2 + (z_S - z_i)^2}\right) \\ \quad \vdots \\ |\tau_{N,i}| = \dfrac{|\vec{d}_N| - |\vec{d}_i|}{c} = \dfrac{1}{c}\left(\sqrt{(x_S - x_N)^2 + (y_S - y_N)^2 + (z_S - z_N)^2} - \sqrt{(x_S - x_i)^2 + (y_S - y_i)^2 + (z_S - z_i)^2}\right), \end{cases} \quad (3)$$

where the N−1 governing equations are available for three unknown solutions of $x_i$, $y_i$ and $z_i$, and i can vary from 1 to N.

The calculation of the above-stated series of equations/iterations (1), (2) and (3) are performed by a computer (not shown).

For better calibration accuracies, more than one acoustic transmitter device 10 can be deployed. Once the locations of both the acoustic transmitter device 10 $\vec{r}_s$ and the on-vessel receiver 12 have been calibrated, the acoustic calibrations for the on-vessel arrays for the transmitter voltage sensitivity, the receiving voltage sensitivity and the beam patterns can be further performed by following the methodologies known in the art of sonar signal processing. (See for example A. Lee Van Buren, "Procedure for the in situ calibration of Sonar transducers," J. Acoustic Society of America, 90, 48-52, 1991, or Robert J. Urick, Principles of underwater sound, McGraw-Hill Book Company, $3^{rd}$ ed, 1983, p53).

The advantage of the present invention over the prior art is that the new calibration method defined above offers benefits to most phases of sonar array performance assessments and calibrations. It offers the potential to reduce the cost of the present costly ranging calibration methods. It also offers an effective way to calibrate own-vessel sonar systems to verify sonar array design and performance in locations and environments of interest. It provides improvements with periodic sonar array calibrations for maximum sonar array performance and improved maintenance inputs.

In light of the above, it is therefore understood that within the scope of the appended claims, the invention may be practiced otherwise than as specifically described.

What is claimed is:

1. An acoustic transmitting method, comprising:
    deploying an acoustic transmitter device, capable of transmitting and recording a plurality of acoustic signals, from a marine-vessel, wherein said acoustic transmitter device is deployed underwater at a predetermined distance from said marine-vessel and is contained in an expendable package;
    providing at least one predefined standard acoustic signal for underwater acoustic energy transmission by said acoustic transmitter device;
    providing a periodic acoustic signal pulse with encoded information for underwater acoustic energy transmission by said acoustic transmitter device;
    transmitting said at least one predefined standard acoustic signal to ensonify at least one acoustic receiver joined to said marine-vessel, wherein said at least one predefined standard acoustic signal is transmitted from a predefined depth at a specified start time for a specified period of time;
    changing the depth of the acoustic transmitter device during a transmit operation at a selectable rate;
    recording a plurality of acoustic signal data, including acoustic signal data projected by said marine-vessel, by means of said acoustic transmitter device; and
    controlling said acoustic transmitter device by a remote controlled trigger signal and alternately by a plurality of preset conditions.

2. The acoustic transmitting method of claim 1 further comprising:
    transferring and recording a plurality of acoustic signal data to and from the acoustic transmitter device prior to deploying said acoustic transmitter device.

3. The acoustic transmitting method of claim 1 wherein the acoustic transmitter device is capable of terminating its performance by a self destruct after completion of at least one acoustic signal transmission.

4. The acoustic transmitting method of claim 1 wherein the acoustic transmitter device is capable of floating for retrieval after completion of at least one acoustic signal transmission.

5. The acoustic transmitting method of claim 1 wherein the encoded information comprises time information from a clock that is synchronized with a receiver array clock.

6. The acoustic transmitting method of claim 1 wherein deploying the acoustic transmitter device is accomplished through the use of a launching means.

7. The acoustic transmitting method of claim 1 further comprising:
   linking the acoustic transmitter device to a surface buoy antenna; and
   receiving an electric radio frequency signal and a plurality of global positioning satellite data from the surface buoy antenna to the acoustic transmitter.

8. The acoustic transmitting method of claim 1 further comprising:
   calibrating an on-vessel acoustic array using standard methods, based on the information transmitted by the acoustic transmitter device and received at the on-vessel acoustic array.

9. The acoustic transmitting method of claim 5 further comprising:
   transmitting a predefined continuous acoustic source signal from the acoustic transmitter device;
   transmitting at least one periodic time coded acoustic signal from the acoustic transmitter device;
   receiving a plurality of timing information from the at least one periodic time coded acoustic signal by means of a receiving array having N elements joined to said marine vessel;
   decoding the plurality of timing information from the at least one periodic time coded acoustic signal by said receiving array through signal processing means implemented on a computer;
   calculating the duration that the at least one time coded acoustic signal traveled in the water by means of said computer; and
   calculating an acoustic ray path slant range by means of said computer.

10. The acoustic transmitting method of claim 9 wherein calculating the duration that the at least one time coded acoustic signal traveled in the water is accomplished according to $$\begin{cases} |\vec{d}_i| = |\vec{r}_s - \vec{r}_i| \\ t_i = |\vec{d}_i|/c \qquad i, j = 1, 2, \ldots, N, \\ \tau_{ij} = (|\vec{d}_i| - |\vec{d}_j|)/c \end{cases}$$

wherein c is the propagation sound speed of the water, $t_i$ and $\tau_{ij}$ are the signal travel time to the ith array and the difference of the propagation time between ith and jth receiving arrays respectively.

11. The acoustic transmitting method of claim 9 wherein calculating an acoustic ray path slant range further comprises:
   calculating the exact coordinates of $x_s$, $y_s$ and $z_s$ for the acoustic transmitter device subject to the following N $$\text{governing equations} \begin{cases} |\vec{d}_1| = \sqrt{(x_S - x_1)^2 + (y_S - y_1)^2 + (z_S - z_1)^2} \\ |\vec{d}_2| = \sqrt{(x_S - x_2)^2 + (y_S - y_2)^2 + (z_S - z_2)^2} \\ \vdots \\ |\vec{d}_i| = \sqrt{(x_S - x_i)^2 + (y_S - y_i)^2 + (z_S - z_i)^2} \\ \vdots \\ |\vec{d}_N| = \sqrt{(x_S - x_N)^2 + (y_S - y_N)^2 + (z_S - z_N)^2}, \end{cases}$$

in a homogeneous medium.

12. The acoustic transmitting method of claim 9 further comprising:
   calibrating the position of the ith sensor having array coordinates $x_i$, $y_i$ and $z_i$ according to the following iteration of equations implemented on said computer, $$\begin{cases} |\tau_{1,i}| = \frac{|\vec{d}_1| - |\vec{d}_i|}{c} = \frac{1}{c}\left(\sqrt{(x_S - x_1)^2 + (y_S - y_1)^2 + (z_S - z_1)^2} - \sqrt{(x_S - x_i)^2 + (y_S - y_i)^2 + (z_S - z_i)^2}\right) \\ |\tau_{2,i}| = \frac{|\vec{d}_2| - |\vec{d}_i|}{c} = \frac{1}{c}\left(\sqrt{(x_S - x_2)^2 + (y_S - y_2)^2 + (z_S - z_2)^2} - \sqrt{(x_S - x_i)^2 + (y_S - y_i)^2 + (z_S - z_i)^2}\right) \\ \vdots \\ |\tau_{i-1,i}| = \frac{|\vec{d}_{i-1}| - |\vec{d}_i|}{c} = \frac{1}{c}\left(\sqrt{(x_S - x_{i-1})^2 + (y_S - y_{i-1})^2 + (z_S - z_{i-1})^2} - \sqrt{(x_S - x_i)^2 + (y_S - y_i)^2 + (z_S - z_i)^2}\right) \\ |\tau_{i-1,i}| = \frac{|\vec{d}_{i+1}| - |\vec{d}_i|}{c} = \frac{1}{c}\left(\sqrt{(x_S - x_{i+1})^2 + (y_S - y_{i+1})^2 + (z_S - z_{i+1})^2} - \sqrt{(x_S - x_i)^2 + (y_S - y_i)^2 + (z_S - z_i)^2}\right) \\ \vdots \\ |\tau_{N,i}| = \frac{|\vec{d}_N| - |\vec{d}_i|}{c} = \frac{1}{c}\left(\sqrt{(x_S - x_N)^2 + (y_S - y_N)^2 + (z_S - z_N)^2} - \sqrt{(x_S - x_i)^2 + (y_S - y_i)^2 + (z_S - z_i)^2}\right), \end{cases}$$

where the N−1 governing equations are available for three unknown solutions of $x_i$, $y_i$ and $z_i$, and i can vary from 1 to N.

* * * * *